(12) United States Patent  
Mericas (10) Patent No.: US 7,500,138 B2
(45) Date of Patent: Mar. 3, 2009

(54) SIMPLIFIED EVENT SELECTION FOR A PERFORMANCE MONITOR UNIT

(75) Inventor: Alexander E. Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/383,874

(22) Filed: May 17, 2006

(65) Prior Publication Data
US 2007/0294054 A1 Dec. 20, 2007

(51) Int. Cl.
G06F 11/00 (2006.01)
(52) U.S. Cl. .................................. 714/10; 712/227
(58) Field of Classification Search ............ 714/10, 714/47
See application file for complete search history.

(56) References Cited

U.S. PATENT DOCUMENTS

| 6,067,644 | A  | * | 5/2000  | Levine et al. ............... 714/47 |
| 6,539,502 | B1 | * | 3/2003  | Davidson et al. ........... 714/47 |
| 6,718,403 | B2 |   | 4/2004  | Davidson et al. |
| 6,725,363 | B1 | * | 4/2004  | Damron ..................... 712/227 |
| 6,748,522 | B1 | * | 6/2004  | Gregoire et al. ........... 712/227 |
| 6,944,814 | B2 | * | 9/2005  | McGinn et al. ............. 714/819 |
| 7,194,608 | B2 | * | 3/2007  | Mericas ..................... 712/227 |
| 7,331,003 | B2 | * | 2/2008  | Adkisson et al. .......... 714/706 |
| 2004/0153838 | A1 | * | 8/2004  | Swanson et al. ............ 714/39 |
| 2005/0283669 | A1 | * | 12/2005 | Adkisson et al. ........... 714/30 |
| 2006/0174158 | A1 | * | 8/2006  | Check et al. ................ 714/10 |
| 2006/0184777 | A1 | * | 8/2006  | Mericas ..................... 712/227 |
| 2007/0168807 | A1 | * | 7/2007  | Adkisson .................... 714/731 |

* cited by examiner

Primary Examiner—Scott T. Baderman
Assistant Examiner—Paul F. Contino
(74) Attorney, Agent, or Firm—Cantor Colburn LLP; Cas Salys (57) ABSTRACT

A method and a processor for counting events in a performance monitor unit (PMU) of the processor includes using a mask bit and match bit comparison for event data to determine occurrence of events and routing indications of occurrences to a counter for counting.

10 Claims, 4 Drawing Sheets

SIMPLIFIED EVENT SELECTION FOR A PERFORMANCE MONITOR UNIT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention generally relates to the field of microprocessors and more particularly to a microprocessor including a performance monitor unit that uses a shared bus in conjunction with dedicated performance events signals to permit the monitoring of a wide variety of performance events while conserving the area of the layout.

2. Description of the Related Art

U.S. Pat. No. 6,718,403 entitled "Hierarchical Selection of Direct and Indirect Counting Events in a Performance Monitoring Unit", issued Apr. 6, 2004 discloses a microprocessor including a performance monitor unit. The performance monitor unit includes a set of performance monitor counters and a corresponding set of control circuits and programmable control registers. The performance monitor unit receives a first set of event signals from functional units of the processor. Each of the first set of events is routed directly from the appropriate functional unit to the performance monitor unit. The performance monitor unit further receives at least a second set of event signals. In one embodiment, the second set of event signals is received via a performance monitor bus of the processor. The performance monitor bus is typically a shared bus that may receive signals from any of the functional units of the processor. The functional units may include multiplexing circuitry that determines which of the functional units has mastership of the shared bus. Whereas the performance monitor unit is typically capable of monitoring the direct event signals in any of its counters, the indirect event signals may be selectively routed to the counters. The shared bus may be divided into sub-groups or byte lanes where the byte lanes are selectively routed to the set of performance monitor counters. The state of a control register may determine the event that is monitored in the corresponding counter. In one embodiment, the control register provides a set of signals that are connected to the select inputs of one or more multiplexers. The multiplexers receive multiple events signals and, based on the state of their select signals, route one of the received event signals to the corresponding performance monitor counter. Specified states of the select signals may result in the disabling of the corresponding counter or enabling the counter to count system clock cycles rather than any performance event.

Using a byte configurable event bus simplifies the routing of events to the PMU and allows for generic situations within the PMU for dealing with event data. Examples of these generic structures are bit counters (that operate on a single bit within the byte), bit comparators that compare two or more bits, and decoders that operate on multiple bits. These generic structures are powerful but at the same time can be somewhat limiting.

What are needed are flexible structures for counting and decoding patterns of bits within a byte for a performance monitor counter.

SUMMARY OF THE INVENTION

The shortcomings of the prior art are overcome and additional advantages are provided through the provision of a processor suitable for use in a data processing system, including first and second functional units for processing instructions executable by the processor, each functional unit being enabled to generate a direct event signal and an indirect event signal, wherein each event signal indicates the occurrence of a corresponding instruction processing event in the processor; a bus shared by the first and second functional units wherein a set of first indirect event signals is connected to the shared bus when the first functional unit is a master of the shared bus and a set of second indirect event signals is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters; wherein the performance monitor unit includes a monitor mode control register (MMCR) associated with each of the counters, wherein the MMCR provides a signal from the direct event signals and shared bus signals for monitoring, the monitoring by comparison of at least one bit of a byte of the signal to at least one mask bit and at least one match bit and based on the comparison, the signal provides a set of event signals for counting by one of the associated counters.

Also disclosed is a method for counting events in a performance monitor unit (PMU) of a processor, includes selecting a processor comprising first and second functional units for processing instructions executable by the processor, each functional unit being enabled to generate a direct event signal and an indirect event signal, wherein each event signal indicates the occurrence of a corresponding instruction processing event in the processor; a bus shared by the first and second functional units wherein a set of first indirect event signals is connected to the shared bus when the first functional unit is a master of the shared bus and a set of second indirect event signals is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters; wherein the performance monitor unit includes a monitor mode control register (MMCR) associated with each of the counters; providing a signal from the direct event signals and shared bus signals for monitoring; comparing at least one bit within a byte of at least one of the direct event signals and shared bus signals to at least one mask bit and at least one match bit and based on the state of the comparison, providing a set of event signals; counting elements of the set of event signals using an associated counter.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which includes a computer program product for counting events in a performance monitor unit (PMU) of a processor that has first and second functional units for processing instructions executable by the processor, each functional unit being enabled to generate a direct event signal and an indirect event signal, wherein each event signal indicates the occurrence of a corresponding instruction processing event in the processor; a bus shared by the first and second functional units wherein a set of first indirect event signals is connected to the shared bus when the first functional unit is a master of the shared bus and a set of second indirect event signals is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters; wherein the performance monitor unit includes a monitor mode control register (MMCR) associated with each of the counters; the product having instructions for providing a signal from the direct event signals and shared bus signals for monitoring; comparing at least one bit within a byte of at least one of the direct event signals and shared bus signals to at least one mask bit by performing an AND function with the at least one bit and the at least one mask bit; and providing a result and performing a XOR function with the result and the at least one match bit; and determining an element for a set of event signals; and counting elements of the set of event signals using an associated counter.

BRIEF DESCRIPTION OF THE DRAWINGS

The various features and advantages of the invention are apparent from the following detailed description of the invention when taken in conjunction with the accompanying drawings in which.

The detailed description explains the preferred embodiments of the invention, together with advantages and features, by way of example with reference to the drawings.

DETAILED DESCRIPTION OF THE INVENTION

In order to establish a context for the teachings herein, aspects of a data processing system are now presented. Reference may be had to U.S. Pat. No. 6,718,403 entitled "Hierarchical Selection of Direct and Indirect Counting Events in a Performance Monitoring Unit", issued Apr. 6, 2004 that discloses a microprocessor including a microprocessor including a performance monitor unit, the disclosure of which is incorporated by reference herein in it's entirety.

Figure 1:
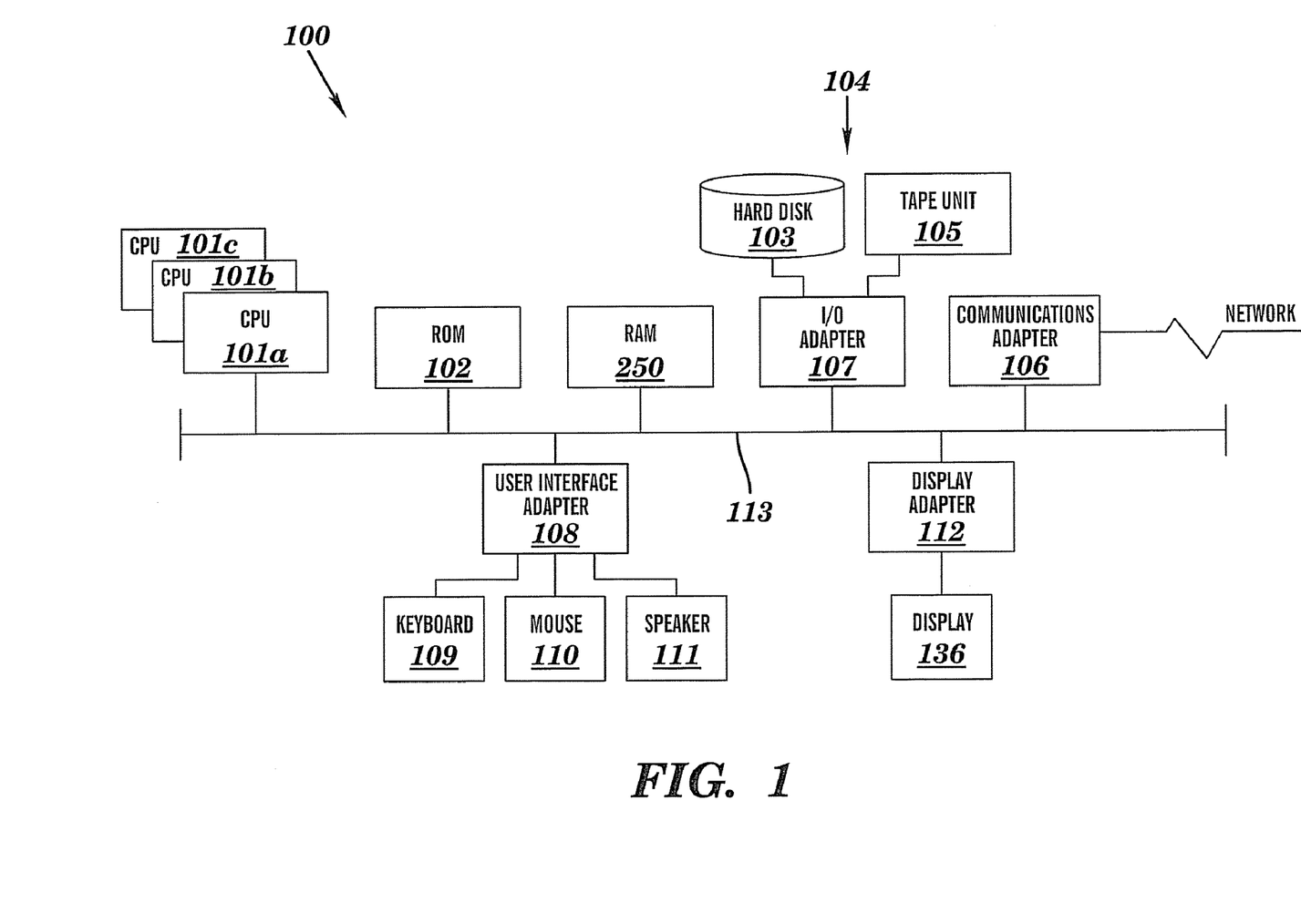
FIG. 1 is a block diagram of a data processing system according to one embodiment of the invention.

Referring now to FIG. 1, an embodiment of a data processing system 100 according to the present invention is depicted. System 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters include the Peripheral Components Interface (PCI) bus. Aspects of the PCI bus are described in *PCI Local Bus Specification Rev. 2.2* available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. For additional information concerning one such chip, reference may be had to the *PC87338/PC97338 ACPI 1.0* and *PC98/99 Compliant Super I/O* data sheet from National Semiconductor Corporation (November 1998).

Thus, as configured FIG. 1, the system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1. Additional detail concerning the AIX operating system is available in *AIX Version 4.3 Technical Reference: Base Operating System and Extensions, Volumes* 1 *and* 2 (order numbers SC23-3159 and SC23-3160); *AIX Version 4.3 System User's Guide: Communications and Networks* (order number SC23-3122); and *AIX Version 4.3 System User's Guide: Operating System* and Devices (order number SC23-3121) from IBM Corporation and incorporated by reference herein.

Figure 2:
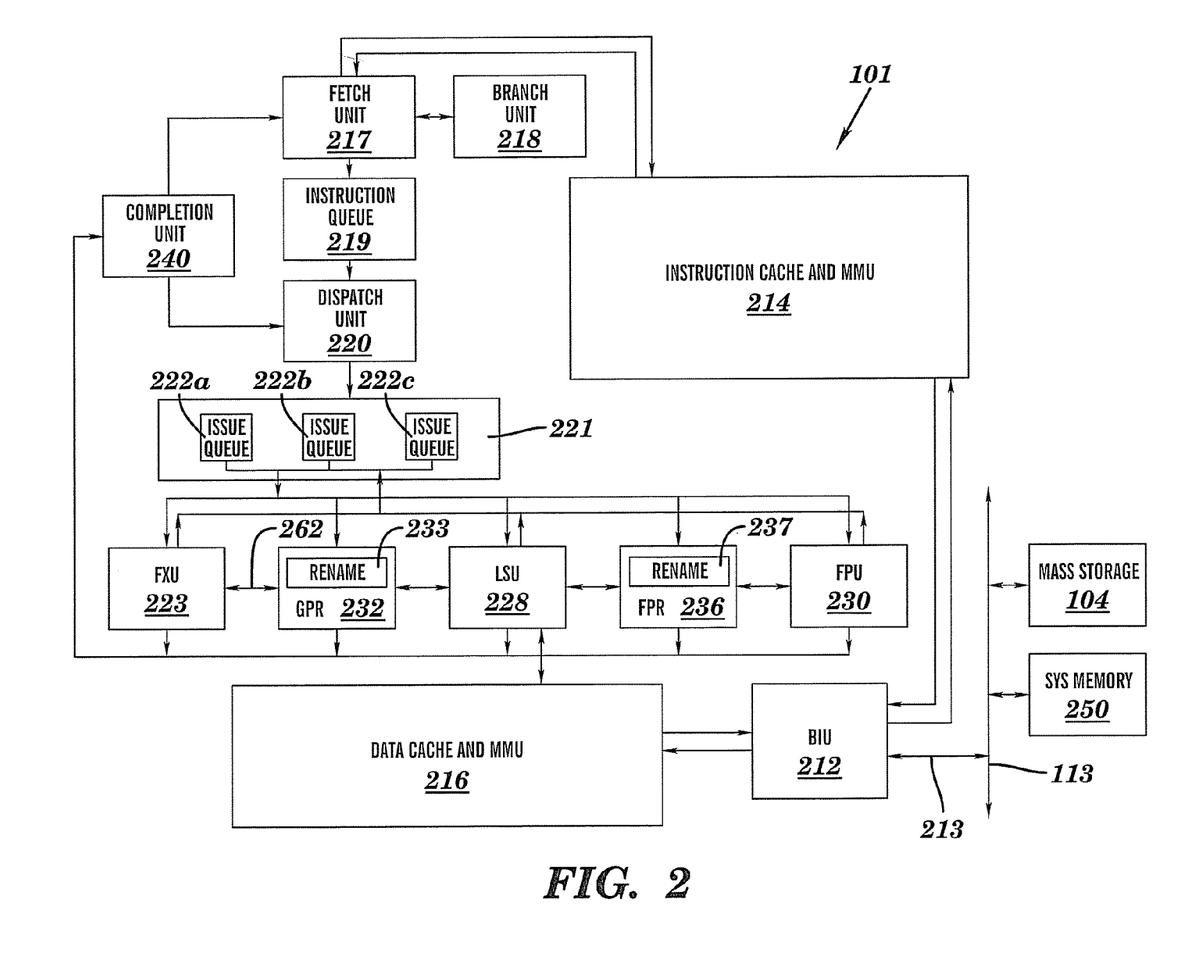
FIG. 2 is a block diagram of a processor suitable for use in the data processing system of FIG. 1.

Turning now to FIG. 2, a simplified block diagram of an embodiment of processor 101 suitable for use in system 100 is presented. In the depicted embodiment, processor 101 comprises an integrated circuit superscalar microprocessor fabricated on a monolithic semiconductor substrate. Processor 101 includes various execution units, registers, buffers, memories, and other functional units as discussed in greater detail below. As illustrated in FIG. 2, processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BIU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, each having a selected number of bits (typically the high-order bits) of the system memory physical address in which the data or instruction reside. Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution. Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240. The depicted embodiment of ISU 221 includes one or more issue queues 222a, 222b, 222c, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 out-of-order.

In the depicted embodiment, the execution circuitry of processor 101, in addition to BPU 218, includes multiple functional units for executing sequential instructions, including fixed-point-unit (FXU) 223, load/store unit (LSU) 228, and floating-point unit (FPU) 230. Each of execution units 223, 228 and 230 typically executes one or more instructions of a particular type of sequential instruction during each processor cycle. For example, FXU 223 performs fixed-point mathematical and logical operations such as addition, subtraction, ANDing, ORing, and XORing, utilizing source operands received from specified general purpose registers (GPRs) 232. Following the execution of a fixed-point instruction, FXU 223 outputs the data results of the instruction to GPR buffers 232, which provide storage for the result received on result bus 262. The FPU 230 typically performs single and double-precision floating-point arithmetic and logical operations, such as floating-point multiplication and division, on source operands received from floating-point registers (FPRs) 236. FPU 230 outputs data resulting from the execution of floating-point instructions to selected FPR buffers 236, which store the result data. As its name implies, LSU 228 typically executes floating-point and fixed-point load instructions, which load data from data cache 216, a lower level cache memory (not depicted), or system memory 250 into selected GPRs 232 or FPRs 236 and floating-point and fixed-point store instructions, which store data from a selected one of GPRs 232 or FPRs 236 to data cache 216 and, ultimately, to system memory 250.

In the preferred embodiment, processor 101 employs both pipelining and out-of-order execution of instructions to further improve the performance of the superscalar architecture. Accordingly, instructions can be executed by FXU 223, LSU 228, and FPU 230 in an order that varies from the original program order of the instructions as long as data dependencies are observed. In addition, instructions are processed by each of FXU 223, LSU 228, and FPU 230 as a sequence of pipeline stages. In one embodiment, processor 101 includes five distinct pipeline stages, namely, fetch, decode/dispatch, execute, finish, and completion.

During the fetch stage, sequential fetch unit 217 retrieves one or more non-branch instructions from instruction cache 214 and stores the fetched instructions within instruction queue 219. In contrast, sequential fetch unit 217 forwards any branch instructions from the instruction stream to BPU 218 for execution. BPU 218 includes a branch prediction mechanism that includes, in one embodiment, a dynamic prediction mechanism such as a branch history table that enables BPU 218 to speculatively execute unresolved conditional branch instructions by predicting whether or not the branch will be taken.

During the decode/dispatch stage, dispatch unit 220 and ISU 221 decode and issue one or more instructions from issue queues 222 to execution units 223, 228, and 230, typically in program order. ISU 221 may allocate a rename buffer within GPR. rename buffers 233 or FPR rename buffers 237 for storing the result of each dispatched instruction. In addition, instructions (or instructions identifiers or tags representative of the instructions) may be stored within the multiple-slot completion buffer (the completion table) of completion unit 240 as a means of tracking which instructions have completed in an out-of-order embodiment.

During the execute stage, execution units 223, 228, and 230 execute instructions issued from ISU 220 opportunistically as operands and execution resources for the indicated operations become available. In one embodiment, each of execution units 223, 228, and 230 are equipped with a reservation station that stores instructions dispatched to that execution unit until operands or execution resources become available. After execution of an instruction has terminated, execution units 223, 228, and 230 store data results, if any, within either GPRs or FPRs, depending upon the instruction type. In the depicted embodiment, execution units 223, 228, and 230 notify completion unit 240 which instructions have finished execution. Finally, instructions are completed in program order out of the completion table of completion unit 240. Instructions executed by FXU 223 and FPU 230 are completed by transferring data results of the instructions from GPR rename buffers 233 and FPR rename buffers 237 to GPRs 232 and FPRs 236, respectively.

Processor 101 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction issue can resume the following clock cycle. Processor 101 may include multiple load units and a single store unit. However, it should be clear to one skilled in the art that processor 101 could include other configurations such as a single load/store unit, etc.

When an instruction is issued, the ISU 221 tags the instruction in such a manner that relative age between any two instructions can be easily determined. In one embodiment, sequential instructions are tagged with sequential integer (ITAGs). In addition to providing a mechanism for determining the issue order and relative age of issued instructions, ITAGs 106 provide a shorthand representation of their corresponding instructions. The ITAG value of each instruction is associated with queue entries and pipeline stages in which it resides. The use of ITAGs facilitates an instruction flush mechanism (in response to a processor-generated flush instruction) in which a magnitude comparison between the ITAG associated with the flush instruction and the ITAG associated with a particular queue entry or functional unit stage is performed and the entry invalidated if it is for an instruction which is as young or younger than (i.e., issued simultaneously or after) the flushed instruction. All remnants of the flushed instruction (and all subsequent instructions) are "flushed" from the machine and the fetch unit is redirected to the fetch starting at the address of the "flushed" instruction.

Figure 3:
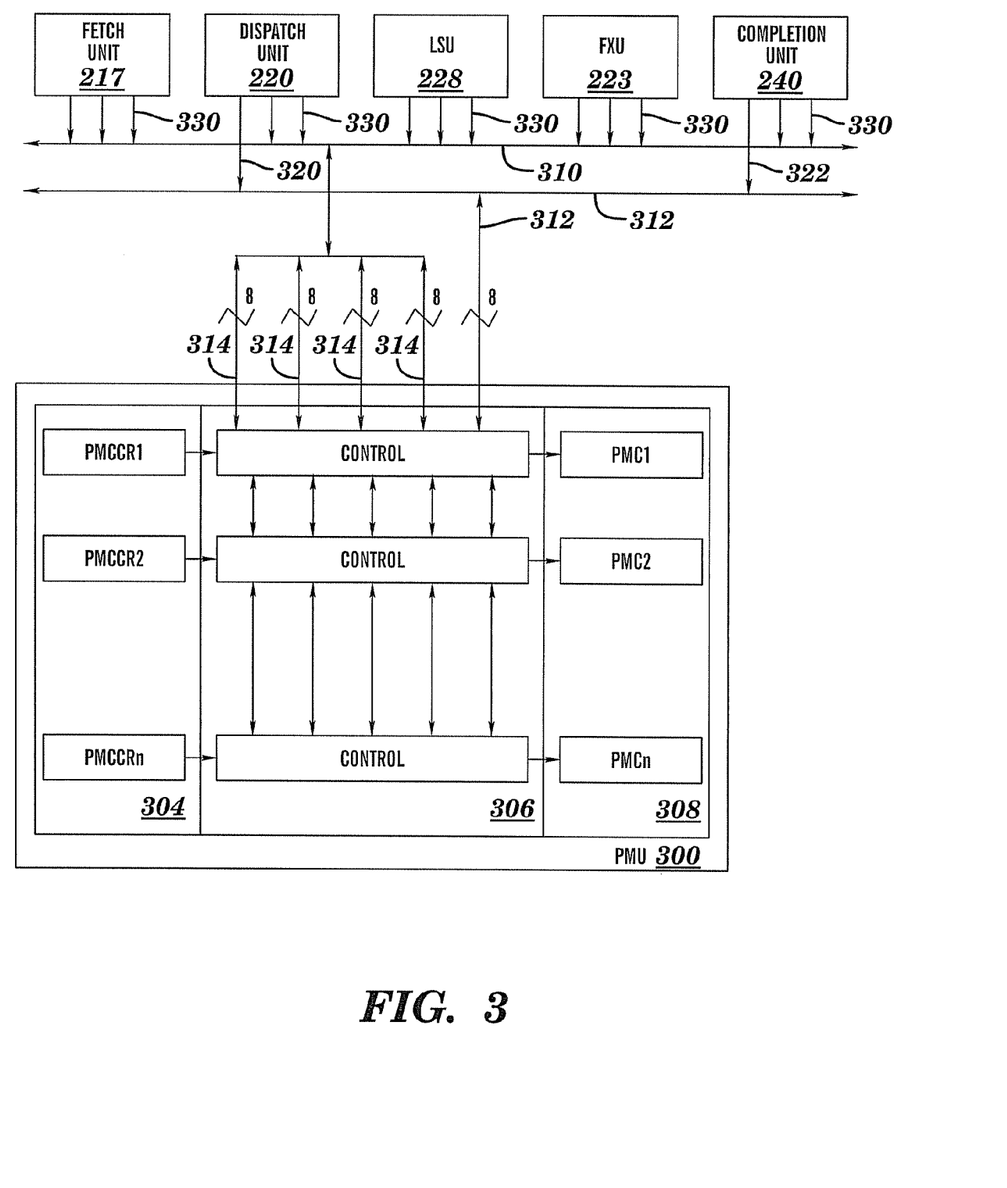
FIG. 3 is a block diagram of selected features of the processor of FIG. 1 emphasizing a performance monitor unit.

Referring now to FIG. 3, each processor 101 according to the present invention includes a performance monitor unit (PMU) 300. PMU 300 is configured to detect and record the occurrence of specified events that occur in the execution units and other functional units of processor 101 described above relative to FIG. 2. The event may result in the generation of an event signal that indicates a specific operation has occurred in a unit of processor 101.

As depicted in FIG. 3, PMU 300 includes a set of control registers 304, control circuitry 306 that is connected to the control registers 304, and a set of performance monitor counters 308. The number of control registers and performance monitor counters is implementation specific, but is typically in the range of four to sixteen counters. Typically, the performance monitor counters 304 are individually programmable via software to specify the event that is associated with (i.e., monitored by) a particular counter.

In a conventionally implemented performance monitor unit, a cross-bar switch may be employed to enable each event capable of being monitored to be associated with each of the available performance monitor counters. The cross-bar switch design was acceptable when the number of events that were capable of being monitored was relatively small. With the advent of superscalar processors, however, the increased number of execution units and increased complexity in the memory hierarchy has resulted in a proliferation in the number of events that system designers want to monitor. Unfortunately, serious constraints on the die size of processor 101 prevent the indiscriminate use of cross bar switches in the performance monitor unit.

To control the size of the circuit required to implement a suitable performance monitor unit, the PMU 300 depicted in FIG. 3 categorizes the number of events capable of being monitored into a set of direct events and indirect events. Direct events represent high priority events, such as the dispatch or completion of an instruction, that must be available to PMU 300 at all times. In the preferred embodiment, direct event signals, each of which indicates the occurrence of a corresponding direct event, are routed directly to PMU 300 via a dedicated wire. The set of direct event wires required to route direct events to PMU 300 is represented in FIG. 3 by reference 312. The depicted embodiment of PMU 300 includes a set of eight direct event wires 312 and is capable of monitoring a maximum of eight direct events. FIG. 3 illustrates an exemplary direct event 320, which may represent and instruction dispatch event, issuing from dispatch unit 220, and an exemplary direct event 322, which may represent an instruction completion event issuing from completion unit 240.

According to one embodiment of the present invention, processor 101 connects indirect event signals to PMU 300 via a shared bus indicated in FIG. 3 by reference numeral 310. Using shared bus 310 to carry indirect event signals beneficially reduces the number of interconnects or wires that must be routed to PMU 300 thereby saving valuable die size. Exemplary indirect events, indicated by reference numeral 330, are illustrated as issuing from fetch unit 217, dispatch unit 220, LSU 228, FXU 223, and completion unit 240.

The functional units of processor 101 may include multiplexing circuitry that controls which of the indirect event signals is connected to shared bus 310 at any given time. Thus, in one embodiment, shared bus 310 may carry indirect event signals generated by fetch unit 217 when fetch unit 217 is the master of shared bus 310 (i.e., the bus master) while carrying indirect event signals generated by fetch unit 220 when fetch unit 220 is the bus master. In addition, it will be appreciated that the spirit and scope of the present invention encompasses other functional units (not depicted in FIG. 3) that may generate indirect event signals which are multiplexed onto shared bus 310. Moreover, the multiplexing of indirect event signals onto shared bus 310 need not be constrained to multiplexing per functional unit. In another embodiment, for example, the indirect event signals from all of the various units of processor 101 may be classified into functional groups. The functional groups may include indirect event signals that provide information relative to a particular performance attribute of processor 101. The multiplexing logic in each of the functional units may be implemented such that the indirect event signals in one or more functional groups are connected to shared bus 310 simultaneously.

In one embodiment of processor 101, the shared bus 310 is implemented as a 32-bit bus that is logically divided into four sub-divisions or "byte lanes" (each indicated by reference numeral 314) of eight bits each. Byte-lanes 314 may be selectively provided to the performance monitor counters 308 of PMU 300 to further reduce the number and complexity of the wires required to implement the design of PMU 300 within a given (and limited) area. Thus, as an example, a first byte lane 314 may be provided to a first, fourth, fifth, and eighth performance monitor counters (PMC) 308 while a second byte lane 314 is provided to second, third, sixth, and seventh performance monitor counters (PMC) 308.

Figure 4:
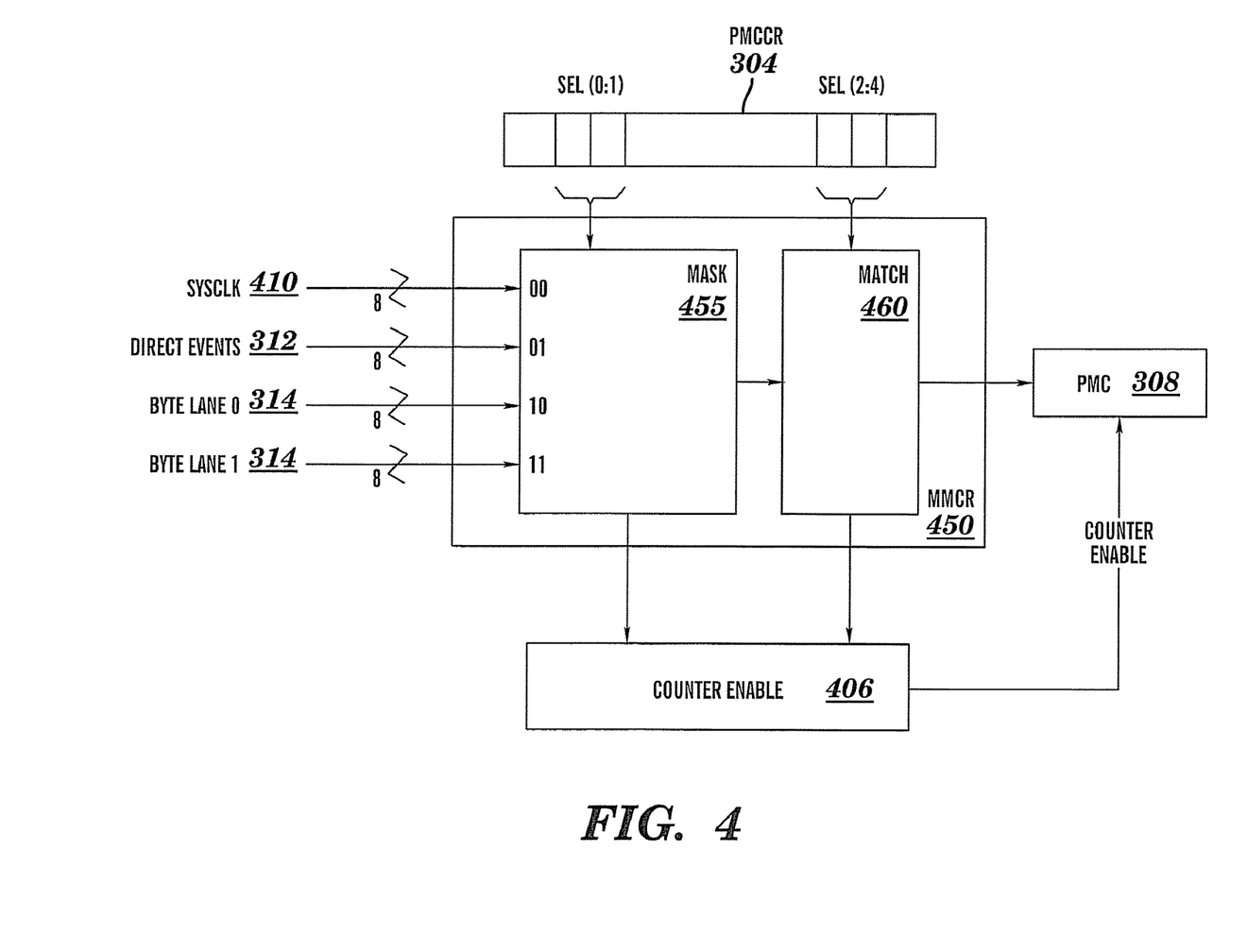
FIG. 4 is a block diagram of selected features of the performance monitor unit of FIG. 3.

Turning now to FIG. 4, additional detail of portions of PMU 300 are illustrated. In FIG. 4, a single performance monitor counter (PCM) 308 of PMU 300 is depicted with corresponding control register (PCMCR) 304 and a monitor mode control register (MMCR) 450. In this embodiment, each monitor mode control register (MMCR) 450 includes at least one mask 455 and at least one match 460 for identification of bits and decoding thereof.

In accordance with the teachings herein, counting events within a respective performance monitor counter (PMC) 308 calls for targeting of bits from within a byte and decoding of patterns in the bits by use of mask values and match values. That is, instead of using multiplexers to select which bit from a byte is to be counted and instead of using decoders to decode patterns of bits within each byte, the teachings herein make use of mask values and match values to identify events that are to be counted.

For discussion purposes, consider an array having an arbitrary length where each element of the array is a bit correlating to a particular event. If one of the bits is set to "on" (=1), the respective bit indicates that the selected event occurred. It is recognized that for the processor 101 there may be hundreds of different events being monitored. While it may be possible to evaluate all events simultaneously, such a procedure would be cumbersome to implement and to use. For illustration and brevity, it is assumed that events are subdivided into single eight (8) bit arrays for each byte, although the size of the actual bytes processed may be varied (for example each byte might contain one of 8 bits, 16, 32 64, 128 bits, more bits or fewer bits).

In order to implement the at least one mask 455 and the at least one match 460 for every Performance Monitor Counter (PMC) 308, a Monitor Mode Control Register (MMCR) is defined that specifies an eight bit mask 455 that is AND'd with the specified byte to select which bits should be operated on, and an eight bit match 460 that is XOR'd with the masked bits and then AND'd together. Since the match 460 is XOR'd, the polarity of the match 460 is opposite that of the bit value to be matched. Accordingly, in order to determine if an individual event is to be counted, a pair of the mask and the match is used for each bit, where a mask bit and a match bit are provided.

More specifically, and as an example, in one embodiment, the mask bit determines if the particular event will be evaluated. The mask bit is logically AND'd with the event indicator bit. A truth table for this operation is provided as Table 1.

TABLE 1

AND Operation for
Event bit and Mask bit

|  | Mask bit | Result |
|---|---|---|
| Event bit | 0 | 1 |
| 0 | 0 | 0 |
| 1 | 0 | 1 |

The match bit determines what value the event should have, (one of on or off (1 or 0)). The match bit is exclusive OR'd (XOR'd) with the results from the mask operation. If either one of the mask result and the match bit are on, the result will be one. Otherwise, the result is zero. A truth table for this operation is provided as Table 2.

TABLE 2

XOR Operation for
Mask Result and Match Bit

|  | Match Bit | Result |
|---|---|---|
| Mask Result | 0 | 1 |
| 0 | 0 | 1 |
| 1 | 1 | 0 |

Applying the results of the AND operation and the XOR operation, a few combinations are realized. The possible combinations and the respective meanings are provided in Table 3.

TABLE 3

Result of Mask/Match Analysis and Event Indications

| Mask | Match | Event Indication |
|---|---|---|
| 0 | 0 | Never match, ignore |
| 0 | 1 | Always match (Don't care) |
| 1 | 0 | Only match event = 1 |
| 1 | 1 | Only match event = 0 |

The "don't care" combination is important because each bit in the 8-bit array is AND'd together for the final result. Without a don't care or always match condition, it would be impossible to ever get a positive final result without an exact match on every bit in the array. Such a restriction is counter-productive as the teachings herein are designed to increase flexibility. Consider the examples provided below.

In a first example, an 8 bit exact match is desired. Respective mask and match values are provided, and a value to match is determined.

8 bit exact match (match=1):
Mask: 0b11111111
Match: 0b01100001
Value to match=0b10011110

In two more examples, a portion of a byte is examined. In a second example, a 1 bit exact match is desired, while in a third example, a 2 bit exact match is desired.

1 bit exact match (match =1)
    Mask: 0b01000000
    Match: 0b10111111
    Value to match = 0b*1******    '*' = Don't care
2 bit exact match, pattern
    Mask: 0b01100000
    Match: 0b10111111
    Value to match = 0b*10*****    '*' = Don't care In order to illustrate a practical application of this approach, consider the following byte from an event bus, where the bits correlate to a Load Store Unit (LSU) which has two sub-units, LSU0 and LSU1.

| Event Bit Location | Event Indication |
|---|---|
| 1 | LSU0 L1 D cache load references |
| 2 | LSU0 L1 D cache store references |
| 3 | LSU0 L1 D cache load misses |
| 4 | L1 D cache store misses |
| 5 | LSU1 L1 D cache store references |
| 6 | LSU1 L1 D cache load misses |
| 7 | LSU1 L1 D cache load misses |
| 8 | L1 D cache entries invalidated from L2 |

To count the occurrences of two cache load references at the same time (one from each sub-unit) the following mask and match pair would be used:
Mask: 0b10001000
Match: 0b01110111

In this example, only the first and fifth bits are selected and they must both be on for a positive result.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A processor suitable for use in a data processing system, comprising:
    first and second functional units for processing instructions executable by the processor, each functional unit being enabled to generate a direct event signal and an indirect event signal, wherein each event signal indicates the occurrence of a corresponding instruction processing event in the processor;
    a bus shared by the first and second functional units wherein a set of first indirect event signals is connected to the shared bus when the first functional unit is a master of the shared bus and a set of second indirect event signals is connected to the shared bus when the second functional unit is a master of the shared bus;
    and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters;
    wherein the performance monitor unit includes a monitor mode control register (MMCR) associated with each of the counters, wherein the MMCR provides a signal from the direct event signals and shared bus signals for monitoring, the monitoring by comparison of at least one bit of a byte of the signal to at least one mask bit and at least one match bit and based on the comparison, the signal provides a set of event signals for counting by one of the associated counters.

2. The processor of claim 1, wherein the performance monitor unit includes a set of programmable control registers corresponding to each of the MMCR, wherein the control registers determine which event signal is selected by the MMCR for monitoring.

3. The processor of claim 1, wherein the shared bus is logically sub-divided and wherein an indirect event signal from a first sub-division of the shared bus is connectable to a first counter but not to a second counter and wherein an indirect event signal from a second sub-division of the shared bus is connectable to the second counter, but not to the first counter.

4. The processor of claim 1, wherein at least one of the performance monitor counters is further connectable to a system clock of the processor when at least a portion of the corresponding control register is in a predetermined state.

5. The processor of claim 1, wherein a performance monitor counter may be disabled based on the state of a programmable control register associated with the counter.

6. A method for counting events in a performance monitor unit (PMU) of a processor, comprising:
    selecting a processor comprising first and second functional units for processing instructions executable by the processor, each functional Unit being enabled to generate a direct event signal and an indirect event signal, wherein each event signal indicates the occurrence of a corresponding instruction processing event in the processor; a bus shared by the first and second functional units wherein a set of first indirect event signals is connected to the shared bus when the first functional unit is a master of the shared bus and a set of second indirect event signals is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters; wherein the performance monitor unit includes a monitor mode control register (MMCR) associated with each of the counters;
    providing a signal from the direct event signals and shared bus signals for monitoring;
    comparing at least one bit within a byte of at least one of the direct event signals and shared bus signals to at least one mask bit and at least one match bit and based on the state of the comparison, providing a set of event signals;
    counting elements of the set of event signals using an associated counter.

7. The method as in claim 6, wherein each byte comprises one of 8 bits, 16 bits, 32 bits, 64 bits, 128 bits.

8. The method as in claim 6, wherein comparing further comprises:
    performing an AND function with the at least one bit and the at least one mask bit; and
    providing a result.

9. The method as is claim 8, wherein comparing further comprises:
    performing a XOR function with the result and the at least one match bit; and
    determining the element of the set of event signals.

10. A computer program product, comprising machine executable instructions stored on a machine readable storage device, the instructions for counting events in a performance monitor unit (PMU) of a processor that comprises first and second functional units for processing instructions executable by the processor, each functional unit being enabled to generate a direct event signal and an indirect event signal, wherein each event signal indicates the occurrence of a corresponding instruction processing event in the processor; a bus shared by the first and second functional units wherein a set of first indirect event signals is connected to the shared bus when the first functional unit is a master of the shared bus and a set of second indirect event signals is connected to the shared bus when the second functional unit is a master of the shared bus; and a performance monitor unit (PMU) including a plurality of performance monitor counters suitable for counting instruction processing events, wherein the PMU is connected to the shared bus and to the set of direct event signals such that, during any selected cycle, each direct event signal may be monitored by at least one of the counters and further wherein at least a portion of the indirect event signals associated with the functional unit that is master of the shared bus may be monitored by at least one of the counters; wherein the performance monitor unit includes a monitor mode control register (MMCR) associated with each of the counters; the product comprising instructions for:

providing a signal from the direct event signals and shared bus signals for monitoring;

comparing at least one bit within a byte of at least one of the direct event signals and shared bus signals to at least one mask bit by performing an AND function with the at least one bit and the at least one mask bit; and providing a result and performing a XOR function with the result and the at least one match bit; and determining an element for a set of event signals; and counting elements of the set of event signals using an associated counter.

* * * * *